No. 804,382. PATENTED NOV. 14, 1905.
J. W. CLIFTON.
COMBINED PLANTER AND CULTIVATING IMPLEMENT.
APPLICATION FILED JUNE 21, 1905.
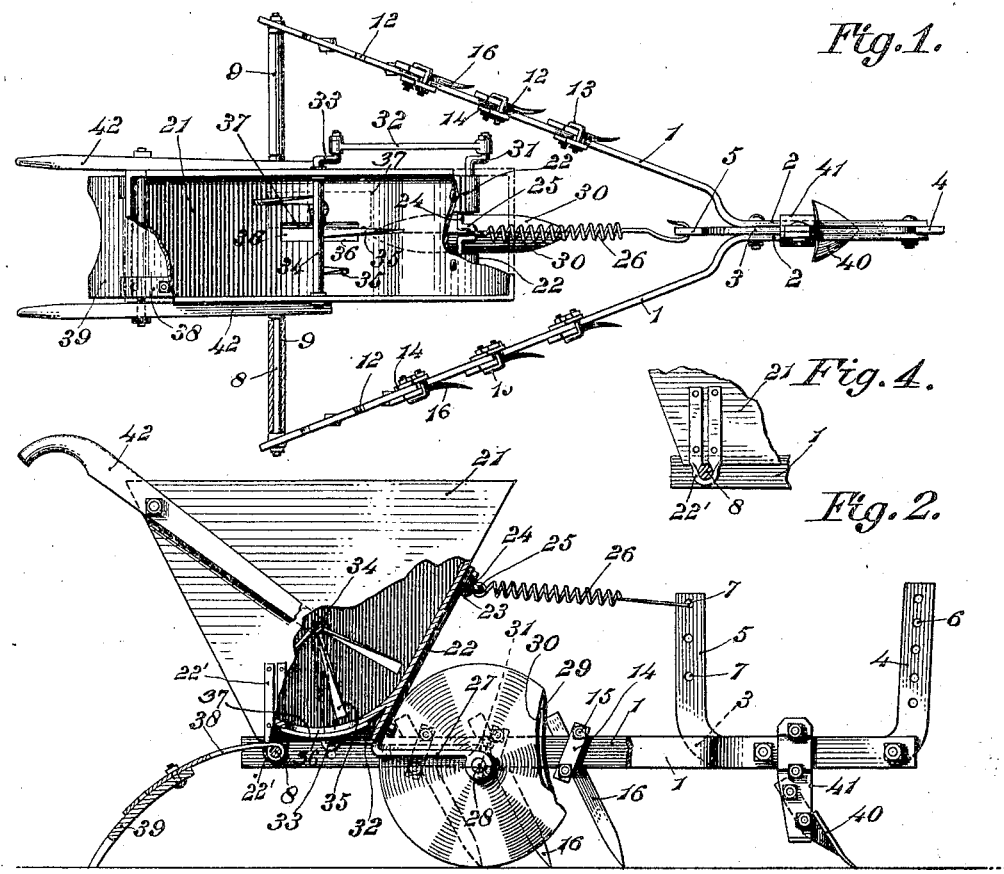
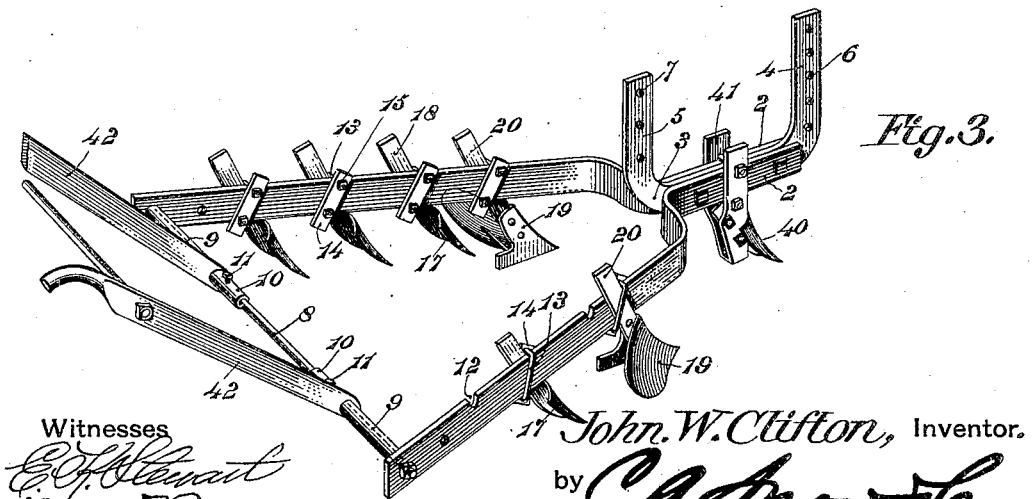
Witnesses
John. W. Clifton, Inventor.
by C. A. Snow & Co
Attorneys

UNITED STATES PATENT OFFICE.

JOHN W. CLIFTON, OF JUNCTION, ARKANSAS.

COMBINED PLANTER AND CULTIVATING IMPLEMENT.

No. 804,382.          Specification of Letters Patent.          Patented Nov. 14, 1905.

Application filed June 21, 1905. Serial No. 266,314.

*To all whom it may concern:*

Be it known that I, JOHN W. CLIFTON, a citizen of the United States, residing at Junction city, in the county of Union and State of Arkansas, have invented a new and useful Combined Planter and Cultivating Implement, of which the following is a specification.

This invention relates to combined implements for planting seed and fertilizing material and for cultivating the ground; and it has for its object to simplify and improve the construction and operation of this class of devices.

With these and other ends in view, which will readily appear as the nature of the invention is better understood, the same consists in the improved construction of a frame with which various earth engaging or cultivating implements may be connected for operation, said frame being also adapted to support a seed box or hopper and operating means for discharging the seed or other material from said hopper.

The invention further consists in approved means for connecting the seedbox flexibly with the frame and for regulating the tension of a spring whereby the earth-engaging wheel from which motion is derived for operating the driven parts of the device is held in ground-engaging position.

The invention further consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a top plan view of the improved device complete, parts having been broken away for the purpose of exposing the subjacent construction. Fig. 2 is a side elevation, partly in section. Fig. 3 is a perspective view showing the frame of the device, the seed box or hopper and related parts having been removed. Fig. 4 is a detail side view of a portion of the hopper, the spacing-bar being shown in section and the near side of the frame being broken away.

Corresponding parts in the several figures are indicated throughout by similar characters of reference.

The frame of the improved device consists of a pair of side members 1 1, having parallel front portions 2 2, which are bolted or otherwise secured upon opposite sides of a spacing member 3, provided at its front and rear ends with upstanding bars or brackets 4 and 5, each having a plurality of transverse perforations 6 and 7. The perforations 6 of the bar 4 are for the attachment of the draft, which may thus be raised or lowered, according to the conditions under which the device is used.

The side members 1 1 of the frame diverge rearwardly and are spaced apart at their rear ends by means of a bolt member 8, having spacing-sleeves 9 and 10, the latter being provided with set-screws 11, whereby they may be secured in various positions upon the bolt member 8. The rear ends of the frame members 1 1 may thus be spaced and retained at various distances apart, as will be readily understood.

The side members 1 1 are provided at their upper edges with notches 12 for the reception of clips 13, the arms or ends of which are connected by means of clip-plates 14, tightening-nuts 15 being employed to secure the parts in related position. These clips are for the purpose of attaching the earth-engaging members, which may consist of plain harrow-teeth, as 16, cultivator-teeth 17, having shanks 18, spreaders or turning-plows 19, having shanks 20, or said earth-engaging implements may be of any desired construction and they may be interchanged at will, so as to subserve the purposes for which the device is at the time being employed.

A seed box or hopper 21 is provided upon the sides thereof with eyes or staples, as 22', extending below the bottom of said hopper and serving to pivotally connect the same with the bolt member 8, upon which said box or hopper is pivotally mounted. The front side of the box or hopper is provided with a pair of plates 22, spaced apart and provided at their upper ends with eyes 23 for the reception of a cross-bar 24, having an intermediately-disposed eye or crank 25, serving for the attachment of one end of a spring 26, the other end of which is adjustably connected with one of the perforations 7 in the bracket member 5. The lower ends of the plates 22 are provided with forwardly-extending bracket members 27, affording bearings for a shaft or axle 28, carrying an earth-engaging wheel 29, which has been represented as being composed of two concavo-convex disks 30, of sheet metal, connected along their edges so as to present a relatively sharp edge for engagement with the soil. The shaft or axle 28 is provided at one end with a crank 31, connected by a pitman 32 with a crank 33 upon a shaft 34, extending transversely through the side walls of the seed box or hopper and provided within the latter with agitators 35, which, when the shaft 34 is rocked or oscillated, will serve to gradually expel the contents of the box through a slot or opening 36 in the bottom of the latter, said slot or opening being capable of regulation as to the width thereof by means of a regulating-slide 37.

Pivotally mounted upon the rod or bolt member 8 are shanks 38, carrying a coverer, as 39, or covering members of any suitable description. A furrow-opener 40 has been shown as carried by a clip member 41, which is clamped upon the parallel forward ends of the side members of the frame and the interposed spacing member 3.

Handles 42 have been shown in Figs. 1 and 2 as attached to the sides of the seed box or hopper. When the latter is discarded, as in Fig. 3, the handles may be connected directly with the bolt or rod 8 and may be secured upon the latter by means of the sleeves 10, having the set-screws 11.

From the foregoing description, taken in connection with the drawings hereto annexed, the operation and advantages of this invention will be readily understood by those skilled in the art to which it appertains. When the device is to be used for dropping or distributing seed or fertilizing material, the seed-box and its related parts are connected with the frame, upon the side members of which harrow-teeth or other earth-engaging implements of any desired character may be mounted in operative position. As the machine progresses over the ground the soil will be stirred and cultivated, a furrow will be opened, and the wheel 29, traveling in said furrow, will be rotated, thus communicating to the shaft 34 an oscillatory movement, whereby the contents of the box or hopper will be distributed through the slot and caused to drop into the furrow, where it is subsequently covered by the means employed for this purpose. By detaching the board coverer 39, covering members of any description may be substituted. The tension of the spring 26 will be exerted to hold the wheel 29 in frictional engagement with the soil, and the tension may be regulated by proper adjustment of the forward end of the spring in one of the perforations 7. When the hopper and the parts directly related thereto are removed from the frame, the handles may be directly connected with the bolt or bar 8, and the device may thus be converted into a cultivator or harrow by supplying earth-engaging implements of the desired and appropriate construction.

This device, as will be seen, is simple in construction and easily manipulated, and it may be profitably applied to a variety of uses.

Having thus described the invention, what is claimed is—

1. A frame comprising side members diverging rearwardly and having parallel front portions, and a spacing member interposed between said parallel front portions and having upwardly-extending arms, and means for connecting said parallel front portions and spacing member, including an implement-carrying clip.

2. A frame having side members diverging rearwardly and provided with parallel front portions, a spacing member interposed and secured between said front portions and having upwardly-extending transversely-perforated arms, a rod or bolt connecting and spacing the rear ends of the frame members, adjusting-sleeves upon said rod, a hopper supported pivotally upon said rod and having forwardly-extending brackets, an earth-engaging wheel supported upon a shaft journaled in said brackets, and a spring connecting the front of the hopper with a perforation in the rear upstanding arm of the spacing member at the front end of the frame.

3. A frame having rearward-diverging side members, a rod spacing and connecting the rear ends of said side members, adjusting-sleeves on said rod, a hopper supported pivotally upon said rod and having forwardly-extending brackets, and an earth-engaging wheel supported by said brackets.

4. A frame having rearwardly-diverging side members, a rod spacing and connecting the rear ends of said side members, a hopper connected pivotally with said rod and having forwardly-extending brackets, an earth-engaging wheel supported by said brackets, and adjustable spring means serving to depress the front end of the hopper and to hold the wheel in earth-engaging position.

5. A frame having rearwardly-diverging side members, a rod spacing and connecting said side members, a hopper supported pivotally upon said rod and having forwardly-extending brackets, an earth-engaging wheel supported by said brackets, shanks supported pivotally upon the hopper-supporting rod, and covering means connected with said shanks.

6. A frame having rearwardly-diverging side members, a rod spacing and connecting the rear ends of said side members, a hopper supported pivotally upon said rod and having forwardly-extending brackets, an earth-engaging wheel supported by said brackets and having a shaft terminating in a crank, a shaft supported in the hopper and having agitators connected therewith, a crank upon said shaft, and a pitman connecting said crank with the crank upon the wheel-carrying shaft.

In testimony that I claim the foregoing as my own I have hereto affixed my signature in the presence of two witnesses.

JOHN W. CLIFTON.

Witnesses:
   G. H. DISMUKE,
   H. E. WATSON.